United States Patent [19]

Vanaschen et al.

[11] Patent Number: 4,990,170
[45] Date of Patent: Feb. 5, 1991

[54] METHOD AND APPARATUS FOR BENDING AND TEMPERING GLASS PLATES

[75] Inventors: Luc Vanaschen, Eupen, Belgium; Hans-Werner Kuster; Benoit D'Iribarne, both of Aachen, Fed. Rep. of Germany; Heinz Kentrat, Geilenkirchen, Fed. Rep. of Germany

[73] Assignee: Saint-Gobain Vitrage International, Courbevoie, France

[21] Appl. No.: 509,163

[22] Filed: Apr. 16, 1990

[30] Foreign Application Priority Data

Apr. 25, 1989 [DE] Fed. Rep. of Germany ....... 3913571

[51] Int. Cl.$^5$ .................... C03B 23/025; C03B 27/044
[52] U.S. Cl. ........................................ 65/104; 65/107; 65/273; 65/287
[58] Field of Search ................. 65/104, 106, 107, 273, 65/287, 348

[56] References Cited

U.S. PATENT DOCUMENTS 3,734,706  5/1973  Ritter, Jr. ........................... 65/104
4,615,724 10/1986  Fackelman ......................... 65/107
4,682,997  7/1987  Halberschmidt et al. ............ 65/104
4,842,634  6/1989  Vanaschen et al. ................. 65/107

Primary Examiner—Joye L. Woodard
Attorney, Agent, or Firm—Oblon, Spivak, McClelland, Maier & Neustadt

[57] ABSTRACT

Glass plates are bent by discharging a glass plate from a suction plate onto a concave circumferential bending ring. Within the furnace (1) the glass plate is gripped by the suction plate (27) and is moved with the latter out of the furnace (1) into a combined bending and tempering station (10) and is discharged there onto the circumferential bending ring (19) located between two blowing boxes (11,13). Immediately following the discharge of the flass plate onto the circumferential bending ring (19), the suction plate (27) moves back to its starting position and the glass plate is tempered in this position.

8 Claims, 3 Drawing Sheets

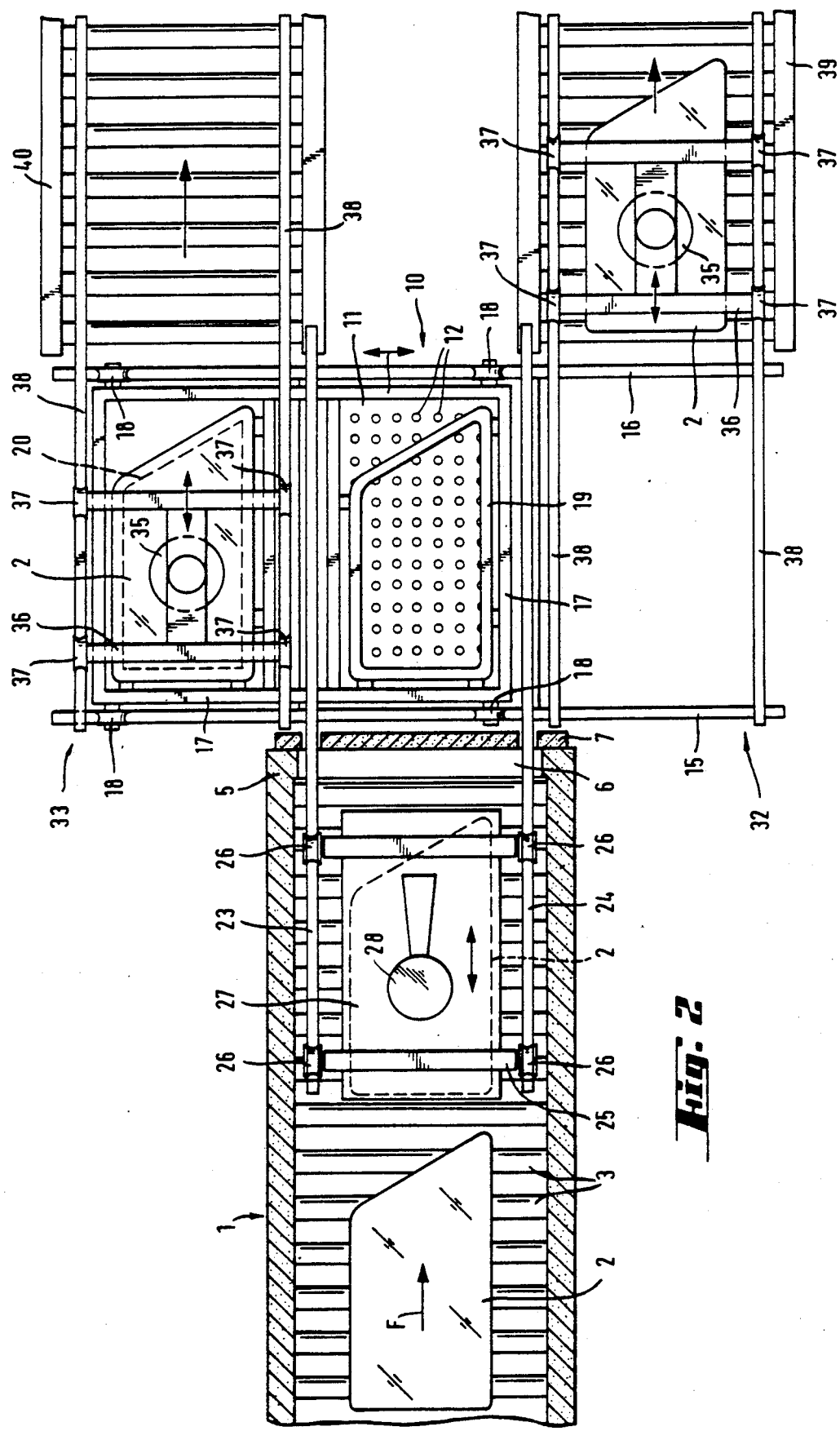

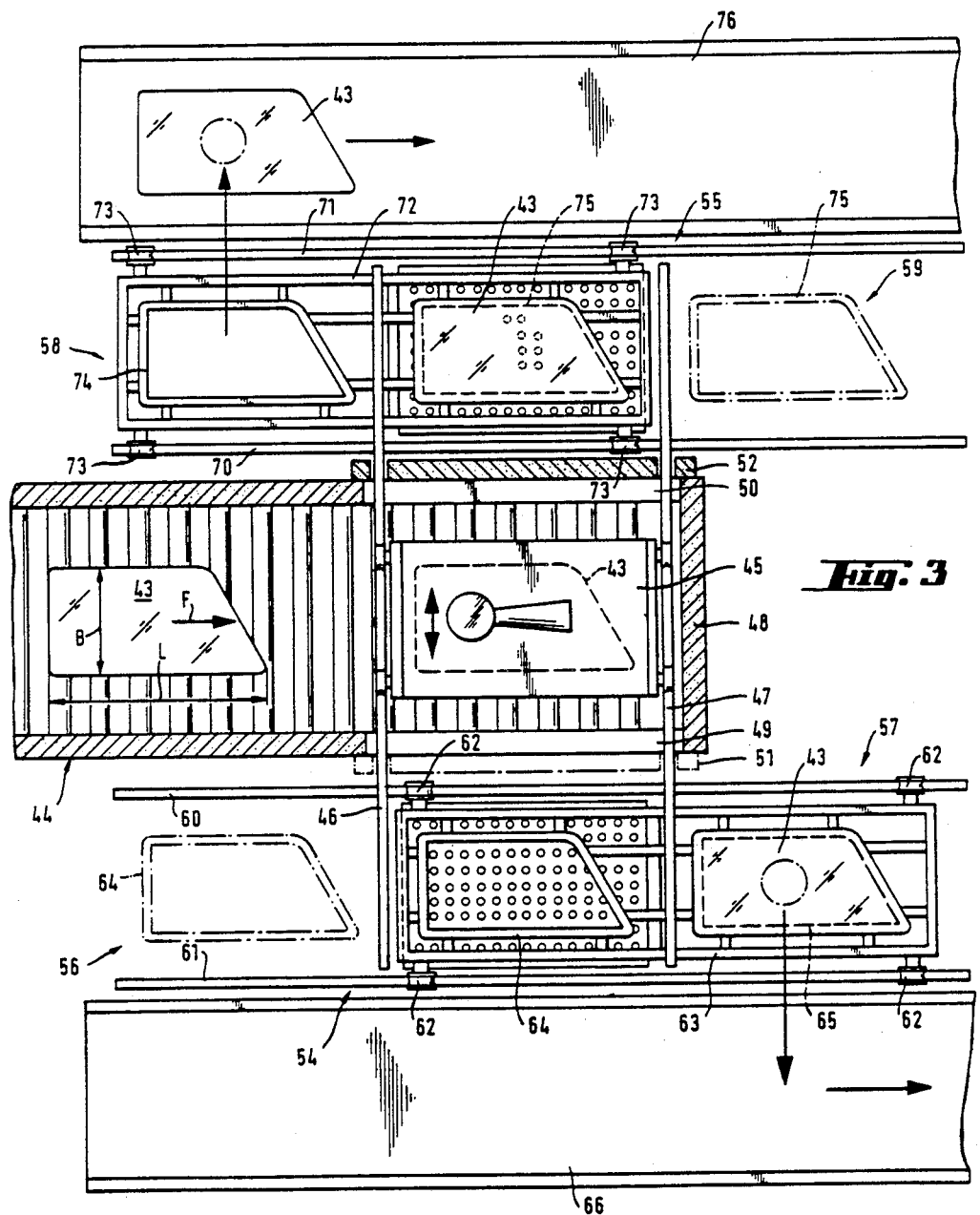

METHOD AND APPARATUS FOR BENDING AND TEMPERING GLASS PLATES

BACKGROUND OF THE INVENTION

Field of the Invention

The invention relates to a method for bending and tempering a glass plate, in which the latter is heated in a horizontal position in a continuous furnace to the bending temperature. After reaching the bending temperature it is raised from the conveyor by a suction plate movable over the glass plate, and with the aid of the suction plate is brought over a concave circumferential bending ring, is bent by dropping onto the circumferential bending ring and while resting on the latter is tempered by blowing cooling air onto both of its sides.

A known method of this type (EP 0 003 391, EP 0 164 823) is already used to a considerable extent. In said known method, after raising the glass pate from the conveyor by the suction plate, the circumferential bending ring is moved into the furnace. The glass plate is discharged onto the circumferential bending ring within the furnace and the ring with the bent glass plate is moved out of the furnace and into the tempering station positioned alongside the latter.

From DE-AS 20 00 271 it is known to raise a glass plate from a belt conveyor with the aid of a horizontally movable suction plate, to bend the same on the latter by suction action, to move the bent glass plate with the suction plate between blowing boxes and then to place the same again on the belt conveyor extending from the furnace to behind the cooling mechanism. During the tempering process the glass plate is located directly on the belt conveyor.

DE-36 40 892 A1 discloses a suction plate movable from a continuous roll furnace into an adjacent bending station. In this known apparatus and the method performed by it the glass plate is placed on a bending mold in the bending station, which bending mold comprises a frame bending mold and a bending mold filling the space within the frame bending mold, and the glass plate is bent by a hot gas flow acting from above on the glass plate. With the aid of the frame bending mold, the bent glass plate is subsequently brought into a blowing station positioned alongside the bending station.

SUMMARY OF THE INVENTION

An object of the present invention is to so modify or further develop the aforementioned method for bending and tempering glass plates that the cycle time of the installation is reduced and consequently its productivity is increased.

According to the invention this object is accomplished in that the glass plate gripped within the furnace by the suction plate is moved with the latter out of the furnace into a combined bending and tempering station, where it is discharged on to a circumferential bending ring located between two blowing boxes. Immediately after returning of the suction plate to the furnace, tempering takes place in the tempering and bending station, and the glass plate is moved with the circumferential bending ring out of the bending and tempering station.

As a result, the production capacity of such a bending and tempering apparatus is considerably increased in that the bending process and the tempering process are performed in the same station, and in this way there is no need for an additional conveying of the glass plate between the bending and tempering processes.

It is also of particular significance in the inventive method that, surprisingly, glass plates produced in this way have a much smaller transverse bending than the glass plates produced according to the prior art method. The term "transverse bending" is understood to mean the sagging of the glass plate within the circumferential bending ring due to its own weight. This transverse bending as such is generally undesired, but is unavoidable in the known method.

The unexpected improvement to the shaping of the glass plates in the inventive method can be explained by the fact that in the known method the transverse bending occurs during the time phase between the actual bending phase and the tempering process, which time phase does not exist in the method according to the invention. The actual bending phase is the time phase required by the glass plate to bend from its planar form and engage along its circumference on the circumferential bending mold. In this bending phase only certain areas of the glass plate bear along its circumference on the bending ring. In this phase the weight of the glass plate or its kinetic energy can clearly not lead to a transverse bending of the central area of the glass plate and it is instead utilized in order to give the glass plate the desired cylindrical bending between the bearing lines on the transverse sides of the glass plate. Only when the glass plate engages on the concave mold ring at the deepest point thereof can a force couple formed by gravity and by the bearing points at these deepest points of the mold ring come into effect and lead to the undesired transverse bending. However, this force couple can only occur after the instant in which the central area of the glass plate engages on the mold ring, i.e. the time in which the actual bending process is already ended. In the inventive method, at this time and without any delay, the tempering process can start so that deformability of the glass plate transverse bending cannot occur.

Therefore the invention provides a method which, while utilizing. all the advantages of the prior art method, not only significantly shortens the cycle time of the installation, but as a result of this shortening of the cycle time also leads to a significant improvement in the dimensional stability of the bent glass plate.

According to an advantageous further development of the invention the glass plates are alternately deposited or discharged by the suction plate onto each of two circumferential bending rings, which are juxtaposed and can be synchronously reciprocated. Thus, simultaneously with the moving of a tempered glass plate out of the bending/tempering station, the other circumferential bending mold, which has in the meantime been freed from the glass plate, is moved into the bending-/tempering station, so that the latter is prepared in a very short time for the next bending and tempering process. During the circumferential bending ring change, the suction plate can bring the next glass plate into the bending/tempering station.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 2 shows the installation shown in FIG. 1 in plan view; and

FIG. 3 shows another embodiment of an inventive bending and tempering installation in plan view.

DETAILED DESCRIPTION OF THE PREFERRED EMBODIMENTS

Figure 1:
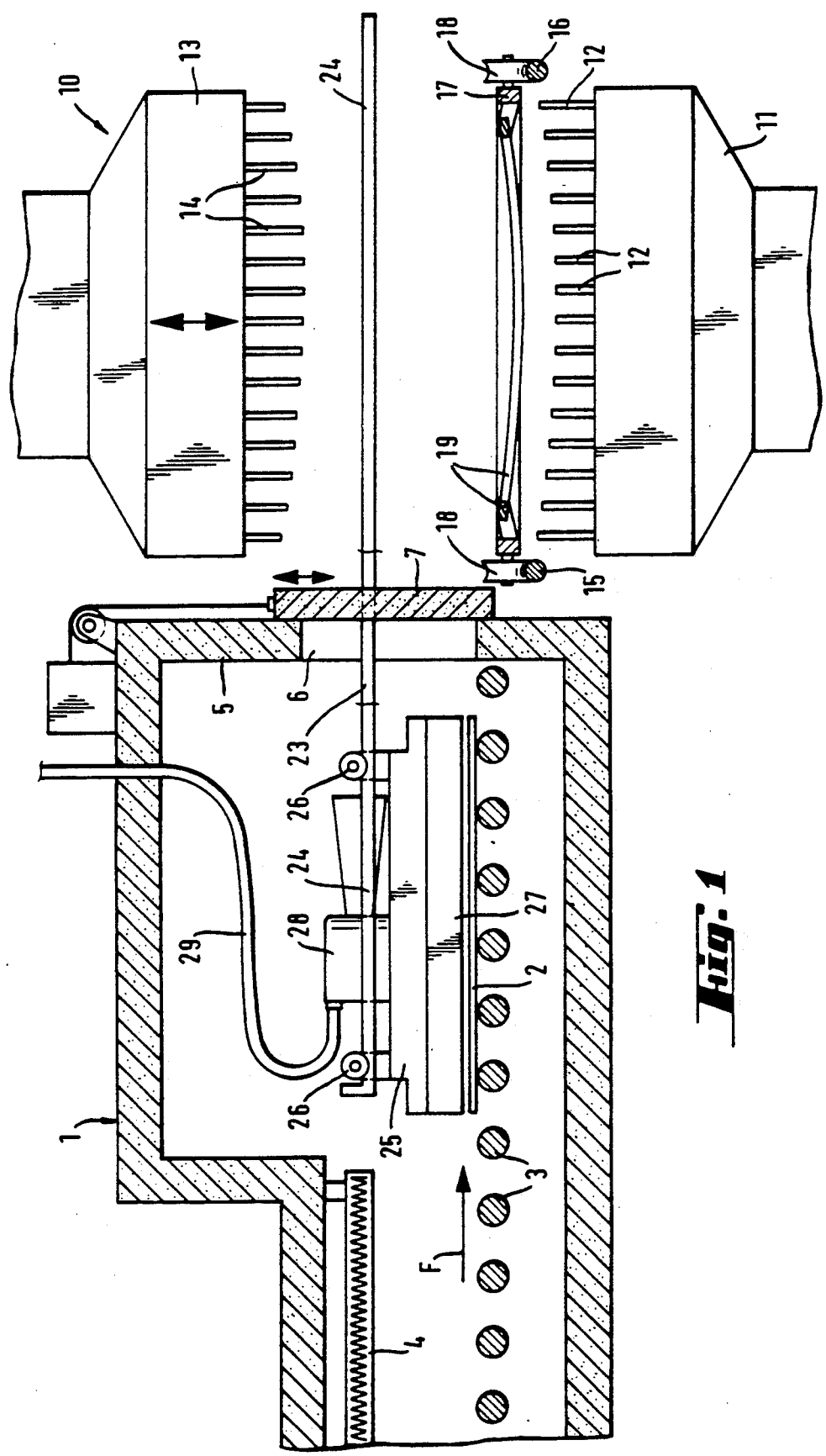
FIG. 1 is a side view, partly in section, of a first embodiment of a bending and tempering installation according to the invention.

FIGS. 1 and 2 show a bending and tempering installation, in which the bending and tempering station, in the direction of the furnace axis, is position axially downstream of the furnace in which the glass plates are heated to their bending temperature.

The furnace 1 is a conventional continuous furnace, through which the glass plates 2 are conveyed at a constant speed in the downstream direction of arrow F by driven conveying rollers 3. By means of electrical heating resistors 4, the glass plates 2 are heated to the necessary bending temperature of approximately 650 degrees celsius. An opening 6 which can be closed by a door 7 is located in the end wall 5 of the furnace 1.

The bending and tempering station 10, which is connected to the furnace 1 in the axial direction of the latter, comprises a lower blowing box 11 with blow nozzles 12 on its top surface, as well as an upper blowing box 13, which is provided on its bottom surface with blow nozzles 14. The upper blowing box 13 is vertically displaceably mounted. Rails 15,16 running at right angles to the furnace axial direction are positioned in the space between the two blowing boxes 11,13. A frame 17 on wheels 18 can be moved on rails 15,16. Two circumferential bending molds 19,20 are juxtaposed with a certain spacing on the frame 17.

Rails 23 and 24 are arranged to extend in the axial direction of the furnace 1 in the last portion of the latter and in the bending and tempering station 10. A carriage or trolley 25 can be moved by means of wheels 26 on said rails 23,24. The carriage 25 carries a suction plate 27. A vacuum pump 28 on carriage 25 provides the necessary vacuum in the suction plate 27, so that the latter raises the glass plate 1 by suction from the conveying rolls and can convey the same into the bending and tempering station 10. The flexible line 29, which is passed out of the furnace 1 through the top or roof of the latter, contains the control lines for the functioning of the suction plate 27 and the movements of the carriage 25.

As can be seen from FIG. 2, the installation also comprises two unloading or discharging stations 32,33, which are arranged on either side of the bending and tempering station 10. On the rails 15 and 16, frame 17 can be moved so far into either of the two discharging stations 32 or 33 that each of the circumferential bending molds 19,20 can assume a discharging position in their respective discharging stations 32,33 while the other circumferential bending mold 19,20 is in the bending and tempering station 10. Each of the two discharging station 32,33 contains a vertically movable suction gripper 35. The latter is positioned on a displaceable carriage 36 which is movable by means of wheels 37 on rails 38. The rails 38 in each case extend over a conveyor 39 or 40 connected to the discharging station 32 or 33 and on which the suction gripper 35 places the glass plate.

The installation functions in the following way. In the continuous furnace 1 the glass plates are heated to their bending temperature of approximate 650 degrees Celsius. As soon as a glass plate 2 reaches a clearly defined position below the suction plate 27, which at this time assumes its end position within the furnace, the vacuum pump 28 is switched on and the suction plate 27 raises the glass plate 2 from the conveying rolls 3. The door 7 is then opened and the carriage 25 with the suction plate 27 and the glass plate 2 gripped by it passes through the opening 6 into the bending and tempering station 10. The upper blowing box 13 is then in its upper position. No later than at the time when the carriage 2 reaches its position in the bending and tempering station 10, the circumferential bending mold 19 has assumed its end position in the bending and tempering station 10.

As soon as both the circumferential bending mold 19 and the glass plate 2 held by the suction pate 27 have assumed their end positions in the bending and tempering station 10, the glass plate 2 is released from the suction plate 27. It drops onto the circumferential bending mold 19 and deforms on the latter under the effect of its kinetic energy and gravity.

Immediately after the glass plate 2 has been released by the suction plate 27, the carriage 25 with suction plate 27 again moves into the end position within the furnace 1 and the door 7 again closes the opening 6. As soon as the carriage 25 has left the bending and tempering station 10, the upper blowing box 13 moves into its lower working position and directly starts blowing on the glass plate. At the end of this blowing process, the blowing box 13 is again moved into its upper end position and the frame 17 carrying the circumferential bending mold 19 moves to its other end position, in which the circumferential bending mold 19 is located in the discharging station 32 and the bending mold 20 is in to enter the bending and tempering station.

In this end position of the frame 17, the glass plate on the circumferential bending mold 19 is simultaneously discharged by the suction gripper 35 and the circumferential bending mold 20 takes over the next glass plate to be bent from the suction plate 27. The described bending and tempering process is repeated and the glass plate bent and tempered on the circumferential bending mold 20 is, following the movement of the frame 17 in the other direction, removed in discharging station 33 from the circumferential bending mold 20 and placed on the conveyor 40. The described process then recommences.

The installation shown in FIG. 3 differs from that described relative to FIGS. 1 and 2 in that the glass plates 43 heated to the bending temperature are moved laterally out of the furnace 44 and not in the axial direction thereof. To this end the suction plate 45 is movable in a direction at right angles to the furnace longitudinal axis on the rails 46,47. Thus, the time needed for conveying the glass plate into the bending and tempering station is reduced, because the width dimensions B of the glass plate are much smaller than the length dimensions L thereof running in the furnace axial direction. The path from the end position of the glass plate in the furnace to the end position of the glass plate in the bending and tempering station in consequently shorter and can therefore be covered in a shorter time. A further increase in the capacity of such an installation in the represented embodiment is achieved in that there is a bending and tempering station on both longitudinal sides of the furnace, so that the production capacity of the installation is doubled.

As can be gathered from FIG. 3 the continuous furnace 44 has a closed end wall 48, but in one longitudinal wall there is an opening 49 and in the other longitudinal wall facing the latter an opening 50. The opening 49 is closed by the door 51 and the opening 50 by the door 52. The suction plate movable at right angles to the furnace axis on the rails 46,47 alternately brings the glass plates heated to bending temperature through the opening 49 into the bending and tempering station 54 and through opening 50 into the bending and tempering station 55.

Alongside each bending and tempering station there are provided two discharging stations, namely alongside the bending and tempering station 54 there are the two discharging stations 56,57 and alongside the bending and tempering station 55 there are the two discharging stations 58,59. The bending and tempering station 54 is connected to the discharging station 56,57 by the rails 60,61 running parallel to the furnace axis and on which run wheels 62 of the carriage 63. The carriage 63 carries two circumferential bending rings 64,65, which are spaced by the distance of the bending and tempering station 54 from a discharging station 56 or 57. While a glass plate is bent and tempered on the circumferential bending ring 64 in the bending and tempering station 54, simultaneously the previously bent and tempered glass plate is taken from the circumferential bending ring 65 in the discharging station 57 and is placed on the horizontal conveyor 66. The transfer mechanism with which the glass plate is transferred from the discharging station to the horizontal conveyor 66 has a conventional construction and has not been shown for reasons of clarity.

The installation on the other longitudinal side of the furnace has the same construction. On this side the bending and tempering station 55 and the discharging stations 58,59 are interconnected by rails 70,71 running parallel to the furnace axis. Carriage 72 runs on wheels 73 on rails 70,71. The carriage 72 once again carries two circumferential bending rings 74,75 which, in the same way as the circumferential bending rings 64,65, are alternately moved into the bending and tempering station 55 and into the associated discharging station 58 or 59. In the discharging stations 58,59 the glass plates are transferred with the aid of (not shown) transfer mechanisms from the circumferential bending rings to the horizontal conveyor 76.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An apparatus for bending and tempering a glass plate, comprising:

a furnace having a conveyor for conveying glass plates in a downstream direction;

a bending and tempering station adjacent said furnace; and a suction plate movable between said furnace and said bending and tempering station for transferring a glass plate from said furnace to said bending and tempering station, wherein said bending and tempering station is external to said furnace and comprises a concave circumferential bending ring on which the glass plate can be supported for bending the glass sheet, a movable carriage on which said bending ring is supported and two blowing boxes positioned for blowing cooling air on a glass sheet supported on the bending ring.

2. The apparatus of claim 1 including:
   rails upon which said carriage is mounted;
   two discharging stations position alongside said bending and tempering station; and
   a second concave circumferential bending ring mounted on said carriage such that one of said bending rings is in one of said discharging stations when the other of said bending rings is in said bending and tempering station.

3. The apparatus of claim 2 wherein said suction plate moves in a direction parallel to the direction of movement of the conveyor and said rails extend transverse to said direction of movement.

4. The apparatus of claim 3 including discharging conveyors positioned adjacent each of said discharging stations and means for transferring glass sheets from said discharging stations to respective ones of said discharging conveyors.

5. The apparatus of claim 2 wherein said suction plate moves in a direction transverse to the direction of movement of the conveyor and said rails extend parallel to said direction of movement.

6. The apparatus of claim 5 including openings in said furnace for removing the glass plates.

7. A method for bending and tempering a glass plate, comprising the steps of:
   heating a horizontal glass sheet to a bending temperature thereof;
   raising the heated glass plate on a suction conveyor;
   moving the heated glass plate raised by the suction conveyor to a bending and tempering station external of the furnace;
   discharging the glass plate from the suction conveyor onto a concave circumferential bending ring in the bending and tempering station, wherein the glass plate is bent;
   immediately tempering the bent glass plate in said bending and tempering station; and
   discharging the bent glass plate on the bending ring from the bending and tempering station.

8. The method of claim 7 wherein said tempering step comprises blowing cooling air from blowing boxes onto the glass sheet.

* * * * *